United States Patent
Schiedermeier et al.

(10) Patent No.: US 11,342,570 B2
(45) Date of Patent: May 24, 2022

(54) METHOD FOR OPERATING A FUEL CELL ARRANGEMENT AND ALSO A CORRESPONDING FUEL CELL ARRANGEMENT

(71) Applicant: AUDI AG, Ingolstadt (DE)

(72) Inventors: Maximilian Schiedermeier, Ingolstadt (DE); Martin Breu, Heilsbronn (DE)

(73) Assignee: AUDI AG, Ingolstadt (DE)

( * ) Notice: Subject to any disclaimer, the term of this patent is extended or adjusted under 35 U.S.C. 154(b) by 433 days.

(21) Appl. No.: 16/051,075

(22) Filed: Jul. 31, 2018

(65) Prior Publication Data
US 2019/0054839 A1 Feb. 21, 2019

(30) Foreign Application Priority Data
Aug. 18, 2017 (DE) .......................... 102017214445.9

(51) Int. Cl.
*H01M 8/04225* (2016.01)
*B60L 58/40* (2019.01)
(Continued)

(52) U.S. Cl.
CPC ......... *H01M 8/04225* (2016.02); *B60L 58/40* (2019.02); *H01M 8/04228* (2016.02); *H01M 8/04567* (2013.01); *H01M 8/04597* (2013.01); *H01M 8/04917* (2013.01); *H01M 16/006* (2013.01); *H02J 1/00* (2013.01);
(Continued)

(58) Field of Classification Search
CPC ......... H01M 8/04225; H01M 8/04917; H01M 8/04228; H01M 8/04567; H01M 8/04597; H01M 16/006; H02J 1/00; H02J 7/34; H02J 1/10; B60L 58/40
See application file for complete search history.

(56) References Cited

U.S. PATENT DOCUMENTS 6,255,008 B1 * 7/2001 Iwase ...................... B60L 58/30
429/9
6,321,145 B1 * 11/2001 Rajashekara ........... B60L 58/30
701/22
(Continued)

FOREIGN PATENT DOCUMENTS

CN 1475378 A 2/2004
CN 100999191 A 7/2007
(Continued)

OTHER PUBLICATIONS

U.S. Appl. No. 16/104,713, filed Aug. 17, 2018.

*Primary Examiner* — Daniel Cavallari
*Assistant Examiner* — Brian K Baxter
(74) *Attorney, Agent, or Firm* — Seed IP Law Group LLP

(57) ABSTRACT

The invention relates to a method for operating a fuel cell arrangement which has a fuel cell for providing electrical energy in an electric circuit that has a circuit which is electrically connected to the fuel cell via a DC-DC converter, and a battery. It is provided that in at least one mode of operation of the fuel cell arrangement, following a start-up of the fuel cell, the battery is electrically disconnected from the circuit, and the DC-DC converter is operated in non-switched mode in order to supply at least one electrical consumer in the circuit with electric current provided by the fuel cell. The invention further relates to a fuel cell arrangement.

15 Claims, 1 Drawing Sheet

(51) Int. Cl.
*H02J 1/00* (2006.01)
*H02J 7/34* (2006.01)
*H02J 1/10* (2006.01)
*H01M 8/04858* (2016.01)
*H01M 8/04228* (2016.01)
*H01M 8/04537* (2016.01)
*H01M 16/00* (2006.01)

(52) U.S. Cl.
CPC ................. *H02J 1/10* (2013.01); *H02J 7/34* (2013.01); *B60L 2210/10* (2013.01); *H01M 2250/20* (2013.01); *H02J 2300/30* (2020.01)

(56) References Cited

U.S. PATENT DOCUMENTS

| | | | | |
|---|---|---|---|---|
| 6,612,385 | B1* | 9/2003 | Stuhler | H01M 8/04225 180/65.31 |
| 7,408,401 | B1* | 8/2008 | Roberts | H03F 1/327 330/3 |
| 2003/0201674 | A1* | 10/2003 | Droppo | H02M 1/34 307/82 |
| 2005/0200998 | A1* | 9/2005 | Rowan | H02M 3/1588 360/69 |
| 2007/0035408 | A1* | 2/2007 | Roberts | G10H 3/187 340/815.45 |
| 2008/0036432 | A1* | 2/2008 | Takada | H01M 8/0491 323/234 |
| 2010/0173211 | A1* | 7/2010 | Kim | H01M 8/04873 429/432 |
| 2011/0032733 | A1* | 2/2011 | Watanabe | H02J 1/10 363/21.14 |
| 2012/0326668 | A1* | 12/2012 | Ballatine | H02J 7/34 320/109 |
| 2013/0038120 | A1 | 2/2013 | Mimatsu et al. | |
| 2015/0002407 | A1* | 1/2015 | Knausz | H02M 1/44 345/173 |
| 2015/0207159 | A1* | 7/2015 | Matsusue | H01M 8/04619 429/9 |
| 2015/0229202 | A1* | 8/2015 | Varigonda | H01M 8/04947 323/282 |
| 2017/0033380 | A1 | 2/2017 | Chung et al. | |
| 2017/0203669 | A1* | 7/2017 | Kato | H01M 8/04302 |
| 2018/0007634 | A1* | 1/2018 | Pereira | H04W 52/0264 |
| 2018/0251121 | A1* | 9/2018 | Jorgensen | B60W 10/08 |
| 2018/0348270 | A1* | 12/2018 | Karlsson | H02M 3/156 |
| 2019/0058202 | A1* | 2/2019 | Schiedermeier | H01M 8/04225 |

FOREIGN PATENT DOCUMENTS

| | | |
|---|---|---|
| CN | 101075745 A | 11/2007 |
| CN | 102648108 A | 8/2012 |
| CN | 104340082 A | 2/2015 |
| CN | 105313710 A | 2/2016 |
| CN | 106394266 A | 2/2017 |
| DE | 101 63 841 A1 | 7/2003 |
| DE | 10 2007 051 362 A1 | 4/2009 |
| DE | 20 2006 020 706 U1 | 9/2009 |
| DE | 11 2008 003 416 T5 | 10/2010 |
| DE | 11 2008 003 478 B4 | 8/2013 |
| DE | 10 2014 011 768 A1 | 2/2015 |
| DE | 10 2015 010 114 A1 | 3/2016 |
| DE | 10 2015 207 413 A1 | 10/2016 |
| EP | 0 972 668 A2 | 1/2000 |
| EP | 1 225 082 A2 | 7/2002 |
| EP | 2 226 878 A1 | 9/2010 |

* cited by examiner

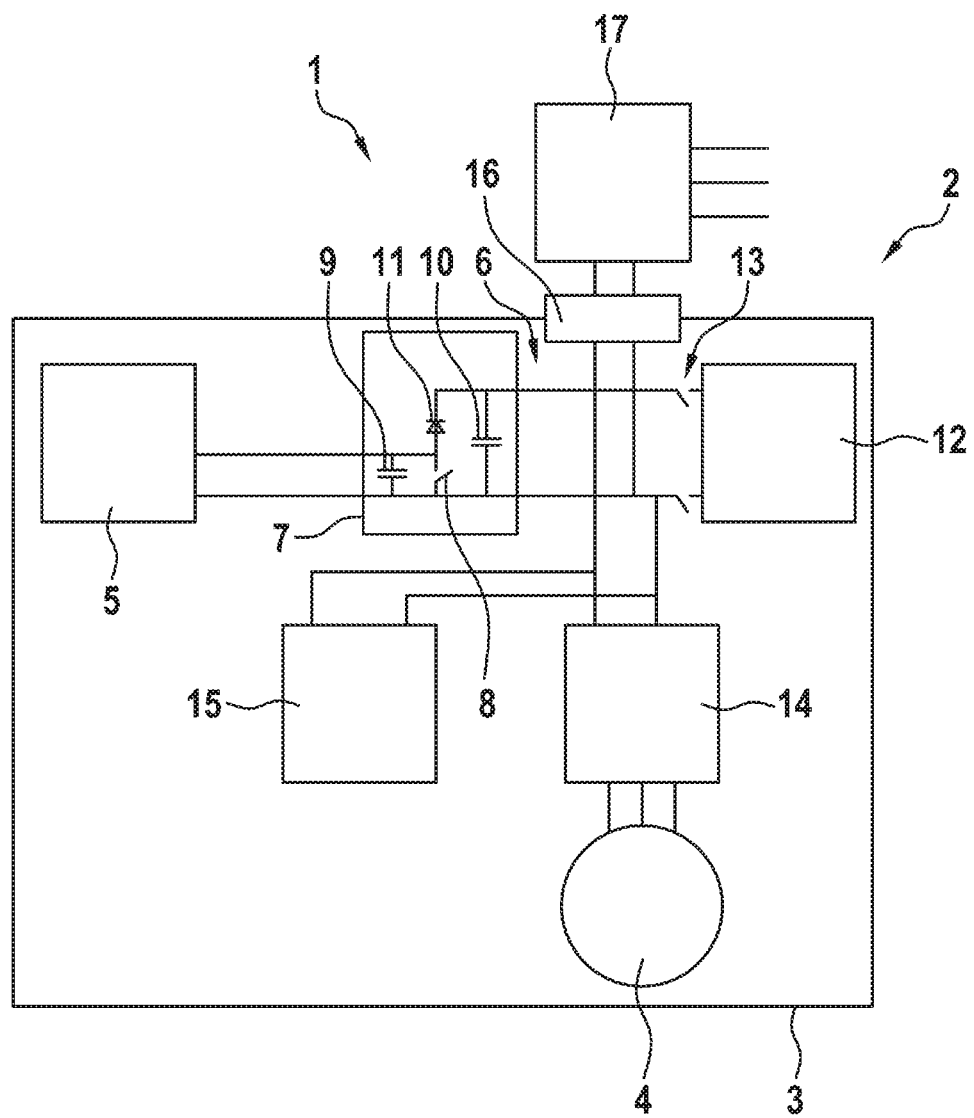

METHOD FOR OPERATING A FUEL CELL ARRANGEMENT AND ALSO A CORRESPONDING FUEL CELL ARRANGEMENT

BACKGROUND

Technical Field

The invention relates to a method for operating a fuel cell arrangement which has a fuel cell for providing electrical energy in an electric circuit, the circuit being electrically connected to the fuel cell via a DC-DC converter, and a battery. The invention further relates to a fuel cell arrangement.

Description of the Related Art

The fuel cell arrangement forms, for example, a component of a drive device for a motor vehicle. The drive device is used to drive the motor vehicle, in that it thus provides a drive torque directed at driving the motor vehicle. The drive device has at least one drive unit which is preferably designed as an electric machine. In this case, the fuel cell arrangement serves to provide electrical energy for operating the electric machine. The electric motor can also be described as a traction machine.

The fuel cell arrangement includes the fuel cell which serves to provide electrical energy or electric current for the circuit. At least one consumer is connected to the circuit, for example, the drive unit. The circuit itself is connected electrically to the fuel cell via the DC-DC converter. Furthermore the circuit is assigned the battery by means of which electrical energy or electric current can be temporarily stored, in particular electrical energy provided by the fuel cell. In addition, a fuel cell auxiliary unit can be connected to the circuit.

Document DE 10 2015 207 413 A1, for example, is known from the prior art. This describes a power circuit for supplying power in an electrically powered vehicle. The power circuit comprises a DC connector, an electric traction drive, and a DC-AC inverter. This has an alternating voltage side which is connected to the traction drive. A DC-DC converter of the power circuit is equipped with two converter sides. The first converter side is connected via a connection point to a DC side of the DC-AC inverter. The DC connector is also connected to this connection point. Furthermore, the cited document describes a steady-state energy supply system that is complementary in its configuration and is designed for connection to the power circuit.

BRIEF SUMMARY

It is an object of the invention to propose a method for operating a fuel cell arrangement which has advantages over known methods, in particular which enables operation of the fuel cell arrangement with higher efficiency.

This is achieved according to the invention by a method for operating a fuel cell arrangement having the features of claim 1. In this regard, it is provided that in at least one mode of operation of the fuel cell arrangement, following a start-up of the fuel cell, the battery is electrically disconnected from the network, and the DC-DC converter is operated in non-switched mode in order to supply at least one electrical consumer in the circuit with electric current provided by the fuel cell.

As part of the start-up of the fuel cell, it is prepared for the provision of electrical energy. In so doing, the fuel cell is electrically connected to the circuit, namely via the DC-DC converter. The DC-DC converter serves to convert the fuel cell voltage provided by the fuel cell to the circuit voltage present in the circuit, which normally corresponds to a battery voltage of the battery, at least while the battery is electrically connected to the circuit. For example, the battery voltage is always higher than the fuel cell voltage. The battery voltage is preferably at least 250 volts, at least 300 volts, at least 225 volts, or at least 350 volts. The fuel cell voltage is in any case lower than the respective battery voltage, at least when the battery is fully charged.

The difference between the fuel cell voltage and the battery voltage is compensated by the DC-DC converter, wherein the DC-DC converter, for example, operates as a charge pump. The DC-DC converter has at least one circuit-breaker which is periodically opened and closed to convert the voltage. In this case, the DC-DC converter is operated in switched mode, that is, opened and closed with a specific cycle time.

Operation of the DC-DC converter in switched mode implies a loss of efficiency of the fuel cell arrangement. At the same time, however, this is necessary in order to connect the battery and the fuel cell to the circuit simultaneously. In order to increase the efficiency of the fuel cell arrangement, it is therefore provided that, in the at least one mode of operation, the battery is disconnected electrically from the circuit after the fuel cell starts up, and the DC-DC converter is operated in non-switched mode. Consequently, the voltage present in the circuit corresponds to the fuel cell voltage.

The procedure described is particularly useful in the case of a motor vehicle driving operation, that is, operation of the traction machine, with low load fluctuations and/or at low power. Additionally or alternatively, the procedure described can be applied should the electrical energy provided by the fuel cell not be used for running the motor vehicle driving mode, but is rather to be used for operating a device external to the vehicle. The electrical power required for the operation of this device is usually so low that it results in the collapse of the fuel cell voltage and consequently of the circuit voltage. In either case, it is possible without further ado to operate the DC-DC converter in non-switched mode and to supply the traction machine and/or the external device with electrical energy solely with the aid of the fuel cell.

Electrical energy is required in order to start up the fuel cell, in particular to start and/or operate the above-mentioned fuel cell auxiliary unit. The fuel cell auxiliary unit is present, for example, in the form of a fluid pump by means of which fuel and/or an oxidizer, in particular atmospheric oxygen, is fed or at least can be fed to the fuel cell. The fuel cell auxiliary unit is connected to the circuit.

In order to start up the fuel cell, it may be provided to first electrically connect the battery to the circuit and to operate the fuel cell auxiliary unit in order to put the fuel cell into operation. In so doing, the fuel cell preferably makes no contribution to supplying the fuel cell auxiliary unit with electrical energy. Instead, the electrical energy needed to operate the fuel cell auxiliary unit is preferably drawn entirely and exclusively from the battery. Alternatively, it can also be provided for the electrical energy to be provided least partially or fully by recuperation, in particular by means of a traction machine. It can thus be provided, for example, that the energy is in part drawn from the battery and in part supplied by the traction machine. When the fuel cell auxiliary unit is in operation, the fuel cell will also be put into operation in order to then provide electrical energy for the circuit. In this regard, the procedure follows the foregoing explanations.

In the context of a further embodiment of the invention, it can be provided that the DC-DC converter, prior to disconnection of the battery from the power supply, is operated to regulate to a battery amperage of a battery current and, after disconnection, to regulate to a voltage. By the battery amperage is meant the amperage of the electric current which flows from the battery to the circuit or vice versa.

Before disconnection of the battery from the circuit, both the fuel cell and the battery are electrically connected to the circuit. Accordingly, the DC-DC converter is operated in switched mode in order to convert the fuel cell voltage to the battery voltage. This is preferably done in such a way that the battery amperage is regulated, in particular to zero. This means that the DC-DC converter is controlled in such a way that the electrical energy required to operate the circuit or the at least one consumer is largely or even completely provided by means of the fuel cell, and the battery is used only to compensate for fluctuations in the power required.

After disconnection of the battery from the circuit, the DC-DC converter should, however, serve for regulating to the voltage. For example, immediately after disconnection, the DC-DC converter continues to be operated at least temporarily in switched mode, wherein the fuel cell voltage continues to be converted to the battery voltage. For example, in this way the circuit voltage can be continuously adjusted to the fuel cell voltage and subsequently, that is, once the circuit voltage has reached the fuel cell voltage, the DC-DC converter can be operated in non-switched mode. A smooth transition between the operating modes of the fuel cell arrangement is thus guaranteed.

In the context of a further embodiment of the invention, before disconnection, the DC-DC converter is operated so that the battery amperage is lower than a threshold amperage, and the battery is then disconnected from the circuit. The lower the battery amperage, the less problematic it can be to disconnect the battery from the circuit. For this reason, before disconnection of the battery from the circuit, the DC-DC converter should be operated in such a way that the battery current, which is drawn from the battery in the direction of the circuit, is as small as possible, in particular smaller than the threshold amperage or equal to zero.

To this end the DC-DC converter is, for example, operated such that its output voltage at least corresponds to the battery voltage of the battery or is equal thereto. When the battery current or the battery amperage has been reduced in this way, preferably to zero, the battery is disconnected from the circuit so that the circuit is now supplied with electrical energy from the fuel cell via the DC-DC converter. This disconnection of the battery from the circuit makes possible the subsequent operation of the DC-DC converter in non-switched mode.

A further preferred embodiment of the invention provides that the DC-DC converter is operated in the circuit after starting up in order to provide a first voltage, and after disconnection of the battery from the circuit in order to provide a second voltage different from the first voltage. While the battery is connected to the circuit, the DC-DC converter should provide the first voltage on the side of the circuit so that, in other words, the output voltage of the DC-DC converter corresponds to the first voltage.

After disconnection of the battery from the circuit, the output voltage of the DC-DC converter should correspond to the second voltage. The second voltage is preferably lower than the first voltage and is thus lower than the battery voltage. The second voltage is realized by the DC-DC converter being operated in switched or non-switched mode. In the case of operation in non-switched mode, the efficiency of the fuel cell arrangement is significantly improved. Operation in switched mode can, for example, be used for the continuous adjustment of the second voltage to the fuel cell voltage. Upon the second voltage reaching the fuel cell voltage, the DC-DC converter can be operated in non-switched mode so that the aforementioned efficiency advantage is achieved.

A further development of the invention provides that the DC-DC converter has a circuit-breaker that can be operated in switched mode and which is operated in switched mode before the battery is disconnected from the circuit, and in non-switched mode after disconnection. Reference has already been made to the circuit-breaker of the DC-DC converter. This can be operated in switched mode, that is, opened and closed periodically. While the DC-DC converter is operating in non-switched mode, the circuit-breaker preferably remains permanently open. The design of the DC-DC converter with the circuit-breaker enables the fuel cell arrangement to be operated not only with the battery connected to the circuit but also with the battery electrically disconnected from the circuit, wherein in the latter case, extremely energy-efficient operation is realized.

A further embodiment of the invention provides that while the DC-DC converter is operating in non-switched mode, the fuel cell is connected to the circuit via a diode of the DC-DC converter. The diode takes the form of a blocking diode and its forward direction is from the fuel cell towards the circuit. Conversely, its blocking direction is therefore from the circuit towards the fuel cell. Electric energy from the fuel cell thus reaches the circuit via the diode, provided the fuel cell voltage is higher than the circuit voltage. During operation in non-switched mode, the fuel cell is connected to the circuit exclusively via the diode, in other words, solely by a passive electrical component. The aforementioned circuit-breaker does, however, preferably remain permanently open.

A particularly preferred further embodiment of the invention provides that a traction machine of a motor vehicle is used as a consumer, said machine being connected via a pulse-controlled inverter to the network. The traction machine represents the aforementioned drive unit. The traction machine is connected to the network via the pulse-controlled inverter so that, in other words, the pulse-controlled inverter serves to supply the traction machine with electrical energy. For example, in the at least one mode of operation with the battery disconnected from the circuit, the traction machine is operated solely by electrical energy drawn from the fuel cell, in particular should the load fluctuations incurred by the traction machine be low. In this way, it is also possible to operate the traction machine with a DC-DC converter operated in non-switched mode, in other words with a particularly high efficiency of the fuel cell arrangement.

A further development of the invention provides that in a further operating mode which differs from this operating mode of the fuel cell arrangement, the battery remains electrically connected to the circuit, and the DC-DC converter is operated in switched mode, wherein the electrical energy provided by the fuel cell and/or the battery is used to operate the traction machine. While the DC-DC converter is being operated in non-switched mode in the at least one mode of operation, in the further mode of operation it is operated in switched mode. In addition, the battery is electrically connected to the circuit. The electrical energy used for operating the traction machine can accordingly be supplied either by the fuel cell alone, or by the battery alone, or by both together. This mode of operation is particularly advantageous in the event of large load fluctuations occurring during operation of the traction machine. The method described in the context of this description can therefore be used without restrictions over the entire operating range of the traction machine.

Finally, in the context of a further embodiment of the invention, it can be provided that, in the case of load fluctuations of the traction machine below a threshold fluctuation value, the operating mode is used, and in the case of load fluctuations above the threshold fluctuation value, the further operating mode is used. By load fluctuations is meant fluctuations over time in the load or in the output of the traction machine. When the load or output of the traction machine is approximately constant or changes only slowly, the operating mode can be used, during which the DC-DC converter can be operated in non-switched mode, so that particularly high efficiency is realized.

If on the other hand greater load fluctuations occur, namely load fluctuations above the fluctuation threshold value, the further operating mode will be used which provides for switched-mode operation of the DC-DC converter. For example, the gradient over time of the load or of the output of the traction machine is used as the load fluctuations. In this context, the threshold fluctuation value is, for example, a constant threshold value or however a threshold value determined as a function of the operating conditions of the fuel cell arrangement and/or of environmental conditions.

The invention further relates to a fuel cell arrangement, in particular for implementing the method in accordance with the foregoing explanations, wherein the fuel cell arrangement comprises a fuel cell for providing electrical current in an electric circuit, the circuit being electrically connected to the fuel cell via a DC-DC converter, and a battery. In this context, it is provided that the fuel cell arrangement is designed such that, in at least one mode of operation of the fuel cell arrangement following a start-up of the fuel cell, the battery is electrically disconnected from the circuit and the DC-DC converter is operated in non-switched mode in order to supply at least one electrical consumer in the circuit with electric current provided by the fuel cell.

The advantages of such a procedure or such an embodiment of the fuel cell arrangement have already been discussed. Both the fuel cell arrangement and also the method of operating it can be further developed in accordance with the foregoing explanations which are accordingly referenced.

The invention is explained in more detail below with reference to the exemplary embodiments shown in the drawing, without any limitation of the invention ensuing. The only

BRIEF DESCRIPTION OF THE SEVERAL VIEWS OF THE DRAWINGS

The FIGURE shows a schematic representation of a fuel cell arrangement.

DETAILED DESCRIPTION

The FIGURE shows a schematic representation of a fuel cell arrangement 1, for example, as part of a drive device 2 of a vehicle 3 which is only implied here. The drive device 2 has a traction machine 4, to which electrical energy can be applied in order to provide a drive torque directed at driving the motor vehicle 3. The electrical energy is provided here by means of the fuel cell arrangement 1.

The fuel cell arrangement 1 has a fuel cell 5, which serves to provide electrical energy in an electric circuit 6. The fuel cell 5 is connected via a DC-DC converter 7 to the circuit 6. The DC-DC converter 7 has at least one circuit-breaker 8, an input-side capacitor 9, an output-side capacitor 10 and also a diode 11. The forward direction of the diode 11 is from the fuel cell 5 towards the circuit 6. In addition, a battery 12 is connected to the circuit 6, namely via one or more switching devices 13. By means of the switching device 13, the battery 12 can optionally be disconnected from the circuit 6 or electrically connected to it. The switching device 13 may, for example, be configured as a contactor.

Furthermore, the traction machine 4 is connected via a pulse-controlled inverter 14 to the circuit 6. In addition, at least one fuel cell auxiliary unit 15, in other words exactly one fuel cell auxiliary unit 15 or a plurality of fuel cell auxiliary units 15, is connected electrically to the circuit 6. Via an interface 16, an inverter 17 can also be connected to the circuit 6, said inverter serving to supply electrical energy, in particular in the form of an alternating current, for example to a device external to the vehicle which is not shown here.

In order to put the fuel cell 5 into operation, it is provided to first electrically connect the battery 12 to the circuit 6, namely by closing the switching device 13. The fuel cell auxiliary unit 15 is operated next, wherein the electrical energy needed to operate the fuel cell auxiliary unit 15 is drawn from the battery 12. The fuel cell 5 is then put into operation. Once this has been done, in other words a steady-state operation of the fuel cell 5 has been achieved, the battery 12 is disconnected from the circuit 6, namely by opening the switching device 13.

In addition, the DC-DC converter 7 is operated in switched mode—in other words, the circuit-breaker 8 is permanently open. The circuit 6 is thus electrically connected to the fuel cell 5 only through the diode 11. After disconnection of the battery 12 from the circuit 6, the fuel cell auxiliary unit 15 is operated solely by means of the electrical energy provided by the fuel cell 5. This also applies to the operation of the inverter 17 or the device external to the vehicle.

With the described embodiment of the fuel cell arrangement 1, it is on the one hand possible without further ado to operate the traction machine 4 to run a driving mode of the motor vehicle 3, wherein in a first mode of operation of the fuel cell arrangement, the battery is electrically isolated from the circuit 6 also in order to run the driving mode or to operate the traction machine 4, and the DC-DC converter 7 is operated in switched mode.

In a further mode of operation of the fuel cell arrangement 1 that differs from this mode of operation, it may be also provided that the battery 5 remains electrically connected to the circuit 6, and the DC/DC converter 7 is operated in switched mode. The former case is in particular envisaged when there are load fluctuations of the traction machine 4 below a threshold fluctuation value, and finally when there are load fluctuations above the threshold fluctuation value. In the mode of operation in which the DC-DC converter 7 is not operated in switched mode, the consumer external to the vehicle can be supplied with electrical energy in a particularly efficient manner via the inverter 17.

Overall, the method according to this description preferably comprises several steps. The first step provides for the DC-DC converter 7 being operated in such a way that the battery current of the battery 12 is less than a threshold value, in particular is equal to zero. Once this state is reached, the battery 12 is disconnected from the circuit 6, namely by opening the at least one switching device 13; in the case of the described embodiment, the plurality of switching devices 13.

After disconnection of the battery 12 from the circuit 6, in a second step the output voltage of the DC-DC converter 7 and therefore the voltage in the circuit 6 is set to the fuel cell voltage over a certain period of time, preferably continuously. Depending on the power that must be provided by the circuit 6, in particular to operate the least one fuel cell auxiliary unit 15 and/or the traction machine 4, the fuel cell voltage is reduced here from a higher voltage, in particular, the open-circuit voltage of the fuel cell 5, to a lower operating voltage. The voltage in the circuit 6 is preferably corrected to this lower voltage by means of the DC-DC converter 7, in particular continuously. In other words, an adjustment of the required power is provided by means of the DC-DC converter 7, in particular the power required by the fuel cell auxiliary unit 15 and/or the traction machine 4. In this context, the DC-DC converter 7 is operated in switched mode.

When voltage in the circuit 6 equals the fuel cell voltage, in a third step the DC/DC converter 7 is subsequently operated in non-switched mode to realize efficient operation of the fuel cell arrangement 1.

The invention claimed is:

1. A method for operating a fuel cell arrangement, comprising:
   providing electrical energy in a circuit via a fuel cell;
   electrically connecting the circuit to the fuel cell via a DC-DC converter;
   electrically connecting a battery to the circuit;
   starting-up the fuel cell;
   operating the DC-DC converter in a switched mode while the battery is connected to the circuit;
   after starting-up the fuel cell, electrically disconnecting the battery from the circuit; and
   after electrically disconnecting the battery from the circuit, operating the DC-DC converter in a non-switched mode in order to supply at least one electrical consumer in the circuit with electric current provided by the fuel cell.

2. The method according to claim 1, comprising:
   prior to disconnecting the battery from the circuit, operating the DC-DC converter to regulate to a battery amperage of a battery current; and
   after disconnecting the battery, operating the DC-DC converter to regulate to a voltage.

3. The method according to claim 1, comprising:
   prior to disconnecting the battery from the circuit, operating the DC-DC converter so that a battery amperage of a battery current is lower than a threshold amperage; and
   after the battery current is lower than the threshold amperage, disconnecting the battery from the circuit.

4. The method according to claim 1, comprising:
   providing a first voltage via the DC-DC converter after starting-up the fuel cell; and
   after disconnecting the battery from the circuit, operating the DC-DC converter to provide a second voltage in the circuit, the second voltage differing from the first voltage.

5. The method according to claim 1, comprising:
   prior to disconnecting the battery from the circuit, operating the DC-DC converter in the switched mode via a circuit breaker of the DC-DC converter; and
   after disconnecting the battery from the circuit, operating the DC-DC converter in the non-switched mode.

6. The method according to claim 5, comprising maintaining connection of the fuel cell to the circuit via a diode of the DC-DC converter while the DC-DC converter is operating in the non-switched mode.

7. The method according to claim 1, wherein the at least one electrical consumer comprises a traction machine of a motor vehicle, the method comprising connecting the traction machine to the circuit via a pulse-controlled inverter.

8. A method, comprising:
   operating a fuel cell arrangement including transitioning between a first mode of operation and a second mode of operation, wherein:
   the first mode of operation includes:
      providing electrical energy in a circuit via a fuel cell;
      electrically connecting the circuit to the fuel cell via a DC-DC converter and a battery;
      starting-up the fuel cell;
      after starting-up the fuel cell, electrically disconnecting the battery from the circuit; and
      operating the DC-DC converter in a non-switched mode in order to supply at least one electrical consumer in the circuit with electric current provided by the fuel cell; and
   the second mode of operation includes:
      providing electrical energy in a circuit via one or more of a fuel cell and a battery;
      electrically connecting the circuit to the fuel cell via a DC-DC converter;
      electrically connecting the circuit to the battery;
      starting-up the fuel cell;
      after starting-up the fuel cell, maintaining electrically connecting the battery to the circuit; and
      operating the DC-DC converter in a switched mode in order to supply at least one electrical consumer in the circuit with electric current provided by one or more of the fuel cell and the battery.

9. The method according to claim 8, wherein in response to load fluctuations of a traction machine below a threshold fluctuation value, operating the fuel cell arrangement in the first mode of operation, and in response to load fluctuations above the threshold fluctuation value, operating the fuel cell arrangement in the second mode of operation.

10. A fuel cell arrangement operable in at least a first mode of operation, the fuel cell arrangement comprising:
   a circuit;
   a fuel cell for providing electrical energy in the circuit;
   a DC-DC converter, the DC-DC converter electrically connecting the circuit to the fuel cell; and
   a battery, wherein the fuel cell arrangement is configured to electrically connect the battery to the circuit, to startup the fuel cell, and to operate the DC-DC converter in a switched mode while the battery is connected to the circuit, wherein following start-up of the fuel cell, the fuel cell arrangement is configured to electrically disconnect the battery from the circuit, and operate the DC-DC converter in a non-switched mode in order to supply at least one electrical consumer in the circuit with electric current provided by the fuel cell.

11. The fuel cell arrangement of claim 10, wherein the DC-DC converter includes a circuit breaker, the circuit breaker configured to operate the DC-DC converter in the switched mode prior to electrically disconnecting the battery from the circuit.

12. The fuel cell arrangement of claim 10 wherein the at least one electrical consumer comprises a traction machine of a motor vehicle, the traction machine coupled to the circuit via a pulse-controlled inverter.

13. The fuel cell arrangement of claim 10 wherein the DC-DC converter includes a diode, the diode configured to couple the fuel cell to the circuit while the DC-DC converter is operating in the non-switched mode.

14. The fuel cell arrangement of claim 10, wherein the DC-DC converter is operable:
   to regulate to a battery amperage of a battery current prior to disconnecting the battery from the circuit; and
   to regulate to a voltage after disconnecting the battery from the circuit.

15. The fuel cell arrangement of claim 10 wherein the DC-DC converter is operable:
   to provide a first voltage after starting-up the fuel cell; and
   to provide a second voltage different from the first voltage, after disconnecting the battery from the circuit.

\* \* \* \* \*